(12) United States Patent
Chen et al.

(10) Patent No.: US 8,761,708 B2
(45) Date of Patent: Jun. 24, 2014

(54) DIRECT CONVERSION RECEIVER AND CALIBRATION METHOD THEREOF

(75) Inventors: Yiching Chen, San Jose, CA (US); Shih-Chieh Yen, Hsinchu (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 210 days.

(21) Appl. No.: 13/544,138

(22) Filed: Jul. 9, 2012

(65) Prior Publication Data

US 2013/0029626 A1    Jan. 31, 2013

(30) Foreign Application Priority Data

Jul. 26, 2011   (TW) .............................. 100126440 A

(51) Int. Cl.
*H04B 1/10*        (2006.01)
(52) U.S. Cl.
USPC ........................................ 455/296; 455/313
(58) Field of Classification Search
USPC ................. 455/296, 313, 323, 333, 326, 334; 375/148, 149
See application file for complete search history.

(56) References Cited

U.S. PATENT DOCUMENTS

| | | | | |
|---|---|---|---|---|
| 6,933,766 B2* | 8/2005 | Khlat et al. | ................... | 327/359 |
| 7,043,208 B2* | 5/2006 | Nigra | ............... | 455/78 |
| 7,139,543 B2* | 11/2006 | Shah | ............... | 455/296 |
| 7,369,837 B2* | 5/2008 | Kim | ............... | 455/322 |
| 7,657,241 B2* | 2/2010 | Shah | ............... | 455/232.1 |
| 7,949,306 B2* | 5/2011 | Shah | ............... | 455/67.13 |
| 8,010,074 B2* | 8/2011 | Kaczman et al. | ............. | 455/313 |
| 8,140,044 B2* | 3/2012 | Villain et al. | ................. | 455/313 |
| 8,676,145 B2* | 3/2014 | Kaczman et al. | ............. | 455/313 |

* cited by examiner

*Primary Examiner* — Sonny Trinh
(74) *Attorney, Agent, or Firm* — Edell, Shapiro & Finnan LLC

(57) ABSTRACT

A direct conversion receiver including a mixer, a measuring module and a calibration module is provided. When the calibration module adjusts the switch duty cycle of the mixer to being shorter than a standard duty cycle, a first second-order inter-modulation distortion is measured. When the calibration module adjusts the switch duty cycle to being longer than the standard duty cycle, a second second-order inter-modulation distortion is measured. According to the measured distortions, the calibration module determines a calibration signal and provides the calibration signal to the mixer, so as to allow the mixer to have a calibrated duty cycle.

19 Claims, 8 Drawing Sheets

DIRECT CONVERSION RECEIVER AND CALIBRATION METHOD THEREOF

CROSS REFERENCE TO RELATED PATENT APPLICATION

This patent application is based on Taiwan, R.O.C. patent application No. 100126440 filed on Jul. 26, 2011.

FIELD OF THE INVENTION

The present disclosure relates to a wireless communication technique, and more particularly to a technique capable of lowering second-order inter-modulation distortion in a communication system.

BACKGROUND OF THE INVENTION

One of the development trends of radio frequency (RF) communication systems is to simplify circuit designs in order to minimize a chip size as well as to reduce hardware costs. A direct conversion receiver, although having a structure much simpler than that of a superheterodyne receiver, is not prevalent due to being limited by hardware techniques. Accompanied with advancement in manufacturing and circuit techniques, a direct conversion receiver with good performance is gradually becoming possible and is thus increasingly valued in the communication field.

FIG. 1 shows a partial structural view of a typical conventional direct conversion receiver. A preliminary filter 11 first removes noise outside a target frequency band from an RF signal, which is then amplified by a low-noise amplifier 12 providing a predetermined gain. The RF signal is then demodulated by mixers 13 and 14 to generate an in-phase baseband signal I and a quadrature baseband signal Q. However, the direct conversion receiver suffers from a drawback that DC offset, flicker noise and second-order inter-modulation distortion (IMD2) caused by the mixers 13 and 14 due to the RF signal being converted to a baseband signal through one-time mixing, all enter into the frequency band of the baseband signal, such that a signal-to-noise ratio of the signal is lowered.

FIG. 2 shows a relationship diagram between input and output efficiencies of a first-order signal and a second-order signal in the mixer 13. An upper curve represents a relationship between the input and output powers of the first-order signal and a lower curve represents a relationship between the input and output powers of the second-order signal. A power corresponding to an intersecting point of two virtually extended lines of the two curves is commonly referred to as a second-order input intercept point (IIP2). As a value of the second-order input intercept point gets greater, the power of the second-order signal outputted by the mixer gets smaller, which is considered as a more ideal situation.

FIG. 3 shows a schematic diagram of an example of input/output signal spectrum of the mixer 13. Before entering the mixer 13, a target signal carrying valid data, indicated by lined blocks, is distributed at two sides of a central frequency $f_{LO}$. As shown in FIG. 3, near the center frequency $f_{LO}$ are two interference signals respectively occurring at positions of frequencies $f_{LO}+f_1$ and $f_{LO}+f_2$. When a difference between the frequencies $f_1$ and $f_2$ is insubstantial, a second-order inter-modulation distortion, caused by the two interference signals after passing through the mixer 13 that has a second-order non-linear characteristic, falls near the direct-current band to impose significant undesirable effects on the data signal. The situation is further worsened by the incapability of removing the second-order inter-modulation distortion with a subsequent baseband processing procedure. The same issue also takes place in the mixer 14.

Many factors may constitute the second-order inter-modulation distortion. Apart from the abovementioned external noise interferences, a mismatch between the secondary harmonic of the RF signal and components of the mixers 13 and 14 also accounts for a reason of the second-order inter-modulation distortion. As the second-order input intercept point gets greater, the second-order inter-modulation distortion energy in FIG. 3 gets lower. Therefore, circuit standards of many direct conversion receivers have a strict standard for a minimum value of the second-order input intercept point. Further, characteristics of the second-order input intercept point are also regarded as important indices for estimating performance of a direct conversion receiver. Therefore, there is a need for a solution for reducing the second-order inter-modulation distortion in a direct conversion receiver to correspondingly increase the second-order input intercept point.

A currently prevalent Wideband Code Division Multiple Access (WCDMA) communication apparatus is particularly strict on requirements of the second-order input intercept point. In a WCMDA system, a transmitting circuit and a receiving circuit not only are located near each other but also operate concurrently. Supposing the characteristics of the second-order input intercept point of the receiving circuit are unsatisfactory, interference caused by data transmission of the transmitting circuit are then likely to hinder the receiving circuit from successfully receiving external data.

SUMMARY OF THE INVENTION

Therefore, the present disclosure provides a direct conversion receiver and a calibration method thereof. By utilizing a predetermined relationship between a switch duty cycle and a second-order inter-modulation distortion energy of a switch mixer, the direct conversion receiver and the calibration method thereof, without having to carrying out a great amount of tests, are capable of quickly calibrating the switch duty cycle of the switch mixer and effectively reduce the second-order inter-modulation distortion in the direct conversion receiver.

According to an aspect of the present disclosure, a direct conversion receiver comprising a switch mixer, a measuring module and a calibration module is provided. When the calibration module adjusts a switch duty cycle of the mixer to being shorter than a standard duty cycle, a first second-order inter-modulation distortion is measured by the measuring module. When the calibration module adjusts the switch duty cycle to being longer than the standard duty cycle, a second second-order inter-modulation distortion is measured by the measuring module. According to the measured distortions, the calibration module determines a calibration signal and provides the calibration signal to the mixer, so as to allow the mixer to have a calibrated duty cycle.

According to another aspect of the present disclosure, a direct conversion receiver comprising an in-phase switch mixer, a quadrature switch mixer, a measuring module and a calibration module is provided. The in-phase switch mixer, corresponding to an in-phase path and having an in-phase switch duty cycle, converts an RF signal to an in-phase baseband signal. The quadrature switch mixer, corresponding to a quadrature path and having a quadrature duty cycle, converts the RF signal to a quadrature baseband signal. The measuring module measures an in-phase second-order inter-modulation distortion of the in-phase path and a quadrature second-order inter-modulation distortion of the quadrature path. The calibration module adjusts the in-phase switch duty cycle or the quadrature switch duty cycle. When the calibration module adjusts the in-phase switch duty cycle, the quadrature switch duty cycle is a constant cycle. When the calibration module adjusts the in-phase switch duty cycle to being shorter than a standard duty cycle, the measuring module measures a first in-phase second-order distortion and a first quadrature second-order distortion. When the calibration module adjusts the in-phase switch duty cycle to longer than a standard duty cycle, the measuring module measures a second in-phase second-order distortion and a second quadrature second-order distortion. The calibration module determines a calibration signal according to the distortions and provides the calibration signal to the in-phase switch mixer, so that the in-phase switch duty cycle is a calibrated duty cycle.

According to yet another aspect of the present disclosure, a calibration method for a direct conversion receiver is provided. The direct conversion receiver comprises a switch mixer comprising a switch duty cycle. In the calibration method, the switch duty cycle is firstly adjusted to being shorter than a standard duty cycle, and a second-order inter-modulation distortion in the direct conversion receiver is measured as a first second-order distortion. Then, the switch duty cycle is adjusted to being longer than the standard duty cycle, and the second-order inter-modulation distortion is again measured as a second second-order distortion. A calibration signal is determined according to the first second-order distortion and the second second-order distortion and provided to the switch mixer, so as to allow the switch mixer to have a calibrated duty cycle.

According to yet another aspect of the present disclosure, a calibration method for a direct conversion receiver is provided. The direct conversion receiver comprises an in-phase switch mixer and a quadrature switch mixer. The in-phase switch mixer corresponds to an in-phase path and has an in-phase switch duty cycle. The quadrature mixer corresponds to a quadrature path and has a quadrature switch duty cycle. In the method, the in-phase switch duty cycle is set to a constant duty cycle firstly. When the in-phase switch duty cycle is adjusted to being shorter than a standard duty cycle, an in-phase second-order distortion of the in-phase path is measured as a first in-phase second-order distortion, and a quadrature second-order distortion of the quadrature path is measured as a first quadrature second-order distortion. When the in-phase switch duty is next adjusted to being longer than the standard duty cycle, the in-phase second-order distortion of the in-phase path is measured as a second in-phase second-order distortion, and the quadrature second-order distortion of the quadrature path is measured as a second quadrature second-order distortion. A calibration signal provided to the switch mixer is determined by the distortions to allow the switch mixer to have a calibrated duty cycle.

BRIEF DESCRIPTION OF THE DRAWINGS

The above objects and advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
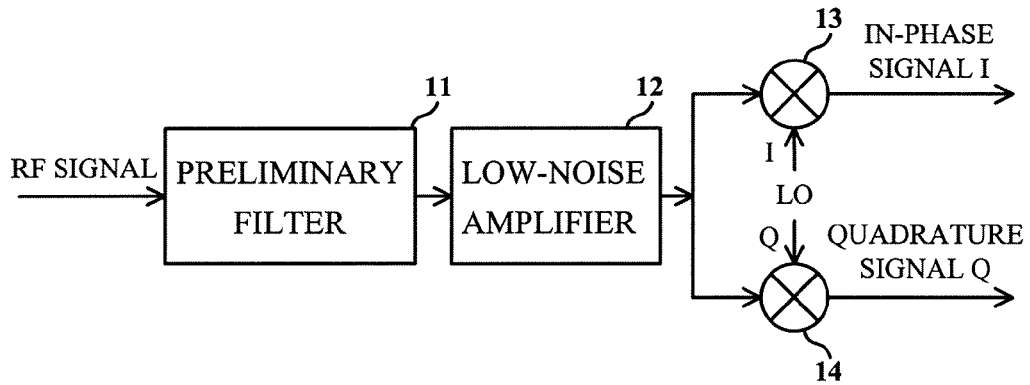
FIG. 1 is a schematic diagram illustrating a partial structure of a typical conventional direct conversion receiver according to the prior art.
Figure 2:
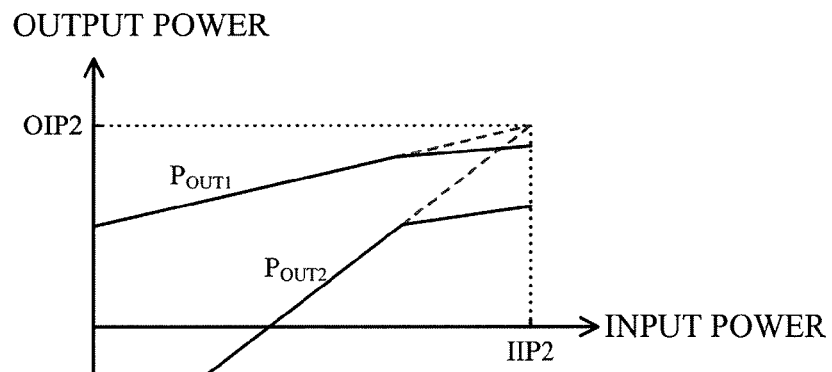
FIG. 2 is a relationship diagram of input/output power of a first-order signal and a second-order signal of a mixer according to the prior art.
Figure 3:
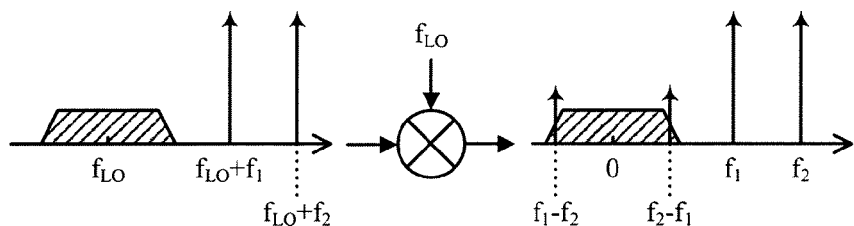
FIG. 3 is a schematic diagram of an input/output signal spectrum of a mixer according to the prior art.
Figure 4:
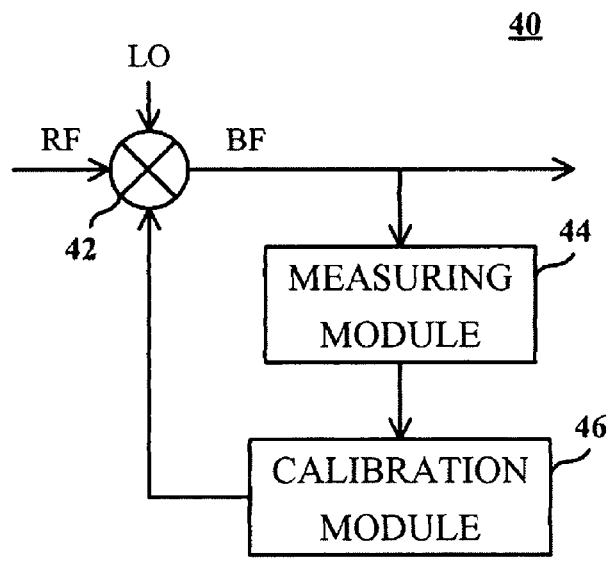
FIG. 4 a partial block diagram of a direct conversion receiver according to an embodiment of the present disclosure.

A direct conversion receiver is provided according to an embodiment of the present disclosure. For example, the direct conversion receiver may be integrated into an RF circuit in a WCMDA wireless communication apparatus. Referring to FIG. 4, a direct conversion receiver 40 according to the embodiment comprises a switch mixer 42, a measuring module 44 and a calibration module 46. To explicitly present technical features of the present disclosure, other hardware components of the direct conversion receiver 40, such as a subsequent baseband circuit, are not depicted in the diagram.

Figure 5:
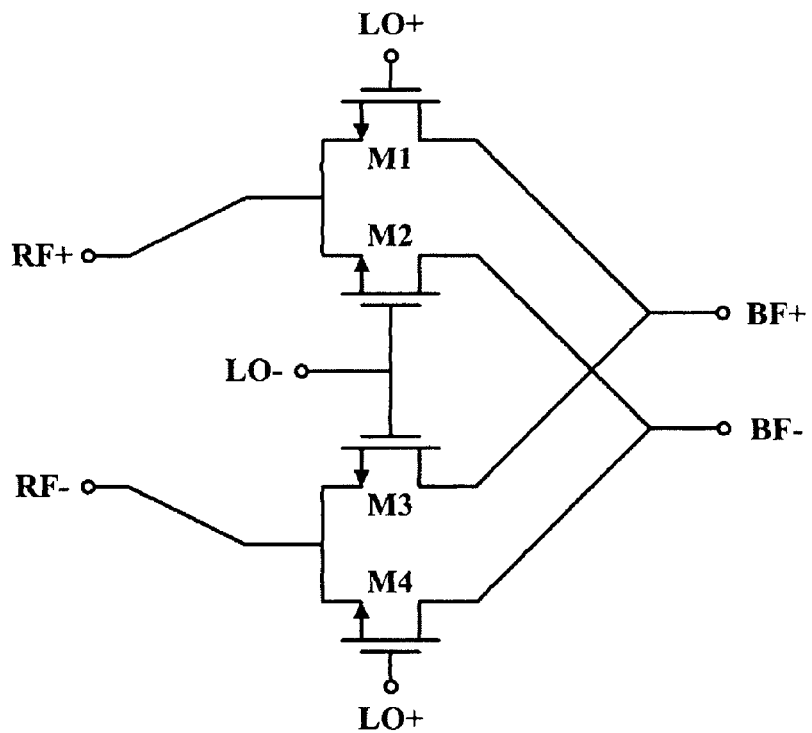
FIG. 5 is a detailed schematic diagram of a switch mixer according to an embodiment of the present disclosure.

FIG. 5 shows a schematic diagram of a switch mixer 42 of the embodiment. In this embodiment, the switch mixer 42 comprises metal oxide semiconductor field effect transistors (MOSFET) M1 to M4, and converts differential signals RF (RF+/RF−) to differential baseband signals BF according to a local oscillation signal LO. In the description below, a square wave signal having a standard duty cycle of 50% is taken as the local oscillation signal LO for example.

The measuring module 44 measures a second-order inter-modulation distortion in the direct conversion receiver 40. For example, the measuring module 44 measures a second-order inter-modulation distortion of the baseband signals BF+/BF− output by the switch mixer 42. Ideally, when the duty cycle of the local oscillation signal LO provided to the transistors M1 to M4 is 50%, a result measured by the measuring module 44 is theoretically zero. However, in practice, even when the above duty cycle is 50%, non-ideal factors such as the mismatch of components in the switch mixer 42 frequently result in a non-zero second-order inter-modulation distortion measured by the measuring module 44. For example, the greater the asymmetry of the differential circuit in the switch mixer 42 gets, the greater the second-order inter-modulation distortion measured by the measuring module 44 is.

In this embodiment, to compensate the mismatch factors of the circuits in order to eliminate the second second-order inter-modulation distortion, the switch duty cycle of the transistors M1 and M4 are designed as adjustable and controllable by the calibration module 46. In practice, the switch duty cycles of the transistors M1 to M4 are the duty cycle of the local oscillation signals LO+/LO− received by respective gates. Since the local oscillation signal LO+ is not an ideal square wave that has a certain potential transient period, increasing a turn on period of the transistors M1 and M4 is in equivalence increasing a high level period and reducing a low level period by increasing a direct-current level of the local oscillation signal LO+. Therefore, the calibration module 46 adjusts the duty cycles of the transistors M1 and M4 by changing the direct-current level of the local oscillation signal LO+.

In this embodiment, the direct-current level of the local oscillation signal LO− provided to the transistors M2 and M3 are designed as constant, so that the duty cycle of the local oscillation signal LO− is 50%. On the other hand, the direct-current levels of the local oscillation signals LO+ provided to the transistors M1 and M4 (to be respectively referred to as $V_{DC1}$ and $V_{DC4}$) are designed as being independently adjustable. For example, the direct-current level of the local oscillation signal LO− may be a fixed voltage $V_{CM}$, and $V_{DC1}$ and $V_{DC4}$ may be designed as varying within a range $V_{CM} \pm V_D$.

As previously described, the greater the asymmetry of the differential circuit in the switch mixer 42 gets, the greater the second-order inter-modulation distortion measured by the measuring module 44 is. Without considering other mismatch factors, the second-order inter-modulation distortion becomes larger as the difference between the two voltages $V_{DC1}$ and $V_{DC4}$ gets greater. In other words, the voltage difference is directly proportional to the second-order inter-modulation distortion at an output end of the switch mixer 42.

Figure 6A:
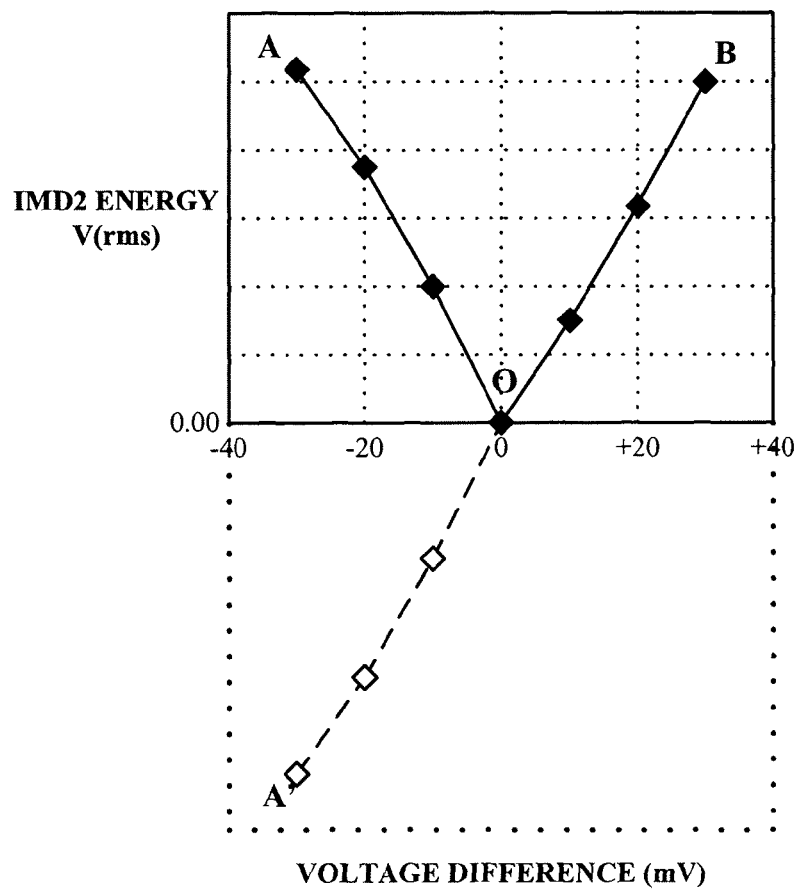
FIGS. 6A to 6D are relationship diagrams of a voltage difference between two voltages $V_{DC1}$ and $V_{DC4}$ and a second-order inter-modulation distortion energy.
Figure 6B:
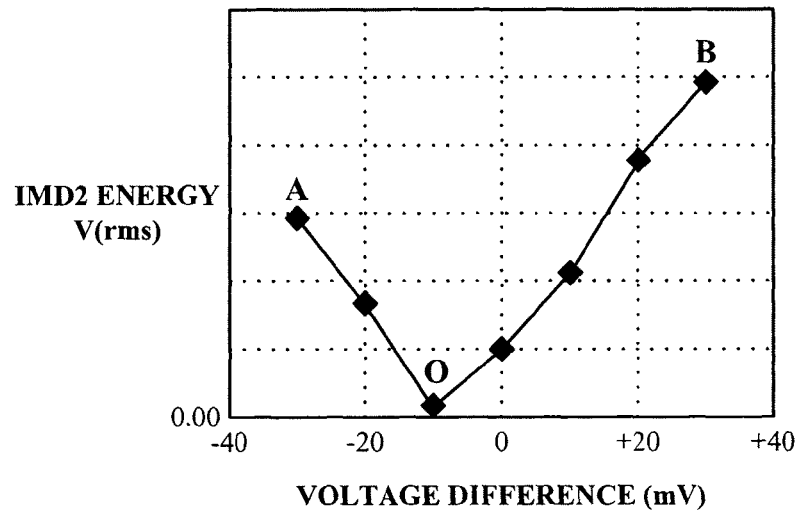
Figure 6C:
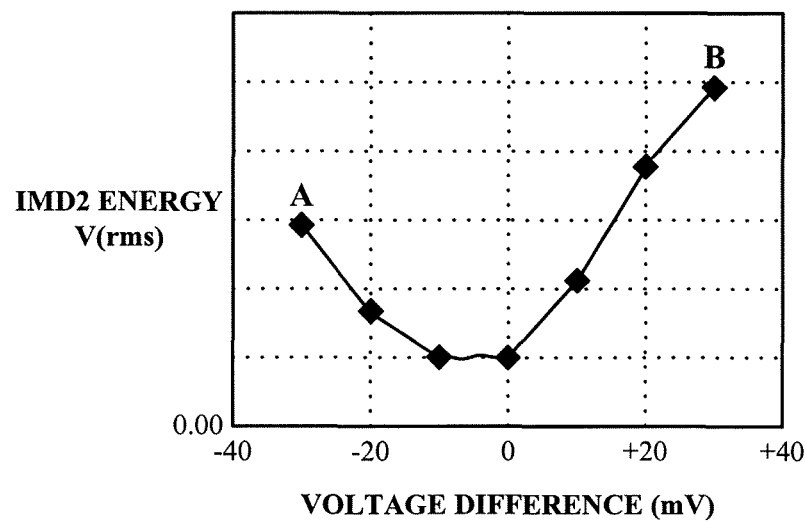

When the voltages $V_{DC1}$ and $V_{DC4}$ are designed as variable within the range $V_{CM} \pm V_D$, the difference between the voltages $V_{DC1}$ and $V_{DC4}$ falls between $+2V_D$ and $-2V_D$. Take $V_D$ equal to 15 mV and an interval of 10 mV as an example. With corresponding second-order inter-modulation distortions acquired through simulations or measured by experiments when the difference between $V_{DC1}$ and $V_{DC4}$ changes from −30 mV to +30 mV, a V-shaped curve is obtained, as shown in FIGS. 6A to 6C. It is to be noted that, as the voltage difference changes from $-2V_D$ to $+2V_D$, the value of the second-order inter-modulation distortion with a positive/negative sign corresponds to a segment A'B. However, since the measuring module 44 is only capable of measuring an absolute value of the second-order inter-modulation distortion, the actual measured result is consisted of segments AO and OB, with the segment AO being regarded as a mirror image of a segment A'0 symmetrical to a horizontal axis in the diagram.

FIG. 6A shows the measured result when no other mismatch factors exist, with an intersecting point O of the segments AO and OB occurring to a position where the voltage difference approximates zero. In contrast, FIG. 6B shows the possible measured result when other mismatch factors exist, with the intersecting point O usually occurring at a position where the voltage difference is a non-zero value. In practice, limited by accuracies of measuring instruments, a relationship diagram obtained by the measuring module 44 is more similar to that shown in FIG. 6C, where the intersecting point O cannot be directly identified.

The calibration module 46 of the present disclosure provides a calibration signal to the switch mixer 42 according to the above relationship. The calibration module 46 first sets $V_{DC1}$ as $V_{CM}-V_D$ and $V_{DC4}$ as $V_{CM}+V_D$, such that a voltage difference of $-2V_D$ exists between the two voltages. With such settings, the switch duty cycle of the transistor M1 is reduced to less than 50% while the switch duty cycle of the transistor M4 is increased to greater than 50%. At this point, the second-order inter-modulation distortion energy measured by the measuring module 44 is a first second-order distortion. Referring to FIG. 6B as an example, the first second-order distortion corresponds to a point A.

Next, the calibration module 46 sets $V_{DC1}$ as $V_{CM}+V_D$ and $V_{DC4}$ as $V_{CM}-V_D$, such that a voltage difference of $+2V_D$ exists between the two voltages. With the setting above, the switch duty cycle of the transistor M1 is increased to greater than 50% while the switch duty cycle of the transistor M4 is reduced to less than 50%. At this point, the second-order inter-modulation distortion energy measured by the measuring module 44 is a second second-order distortion. Referring to FIG. 6B as an example, the second second-order distortion corresponds to a point B.

Figure 6D:
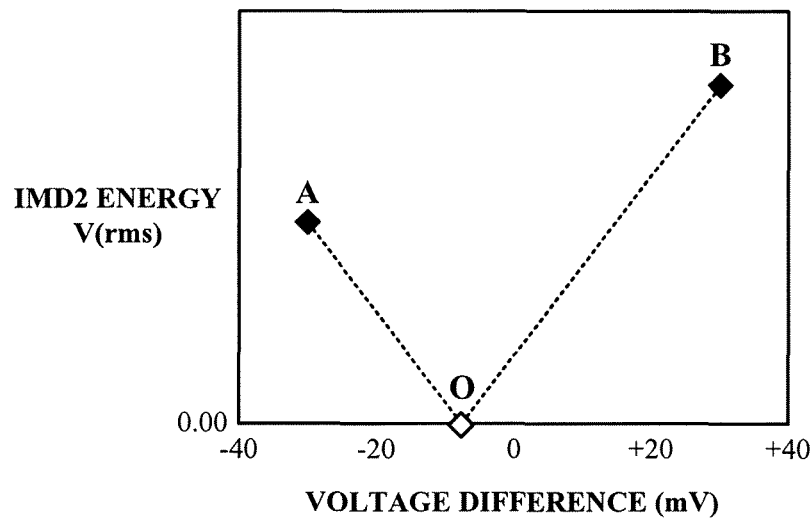

Based on the property that the segment AO is a mirror image of the segment A'O symmetrical to the horizontal axis, regardless whether other mismatch factors are taken into consideration, absolute values of slopes of the segments AO and the segment OB are equal. Therefore, as shown in FIG. 6D, instead of having to measure the second-order inter-modulation energy corresponding to voltage differences between $-2V_D$ and $+2V_D$, the calibration module 46 is able to estimate a position of the intersecting point O provided that the end points A and B are identified. For example, the calibration module 46 may determine the position of the end point A' according to the end point A corresponding to the first second-order distortion, and identify the intersecting point O of the segment A'B and the horizontal axis (with a distortion of zero) in the diagram by utilizing interpolation. The horizontal coordinate of the intersecting point O is the voltage difference capable of providing an optimal compensation to the switch mixer 42. The calibration module 46 then determines a calibration signal according to the voltage difference and provides the calibration signal to the switch mixer 42 to adjust the voltages $V_{DC1}$ and $V_{DC4}$ with the voltage difference, so that the switch mixer 42 is allowed to have a calibrated duty cycle corresponding to a low second-order inter-modulation distortion energy.

In other embodiments, the calibration module 46 may adopt other testing points other than utilizing a voltage difference of $-2V_D$ or $+2V_D$ between the voltages $V_{DC1}$ and $V_{DC4}$. For example, the calibration module 46 may also choose $+V_D$ and $-V_D$ as testing points. Provided that the switch duty cycle adjusted by the calibration module 46 and the standard cycle are large enough (e.g., a difference greater than a threshold is designed between the two), the unidentifiable segment at a lower part of the curve in FIG. 6C may be prevented. An advantage of utilizing the voltages $-2V_D$ and $+2V_D$ is that, the second-order inter-modulation distortions corresponding to the two points are relatively higher for facilitating the measuring process as well as reducing an error resulted by noises.

In other embodiments, the calibration module 46 may also set the direct-current level of the local oscillation signal LO+ provided to the transistors M1 and M4 as constant, and the direct-current level of the local oscillation signal LO− provided to the transistors M2 and M3 as individually adjustable. The effects above may also be achieved by adjusting the voltage difference between the voltages $V_{DC2}$ and $V_{DC3}$. Further, the voltage difference may also be achieved through adjusting the switch duty cycle of one single transistor (e.g., the transistor M1) by the adjusting module 46.

In conclusion, provided that two appropriate testing points are identified by the direct conversion receiver 40, the intersecting point O may be immediately calculated according to the predetermined relationship between the switch duty cycle of the switch mixer 42 and the second-order inter-modulation distortion, so as to effectively reduce the second-order inter-modulation distortion of the receiver without having to undergo a large amount of tests.

Figure 7:
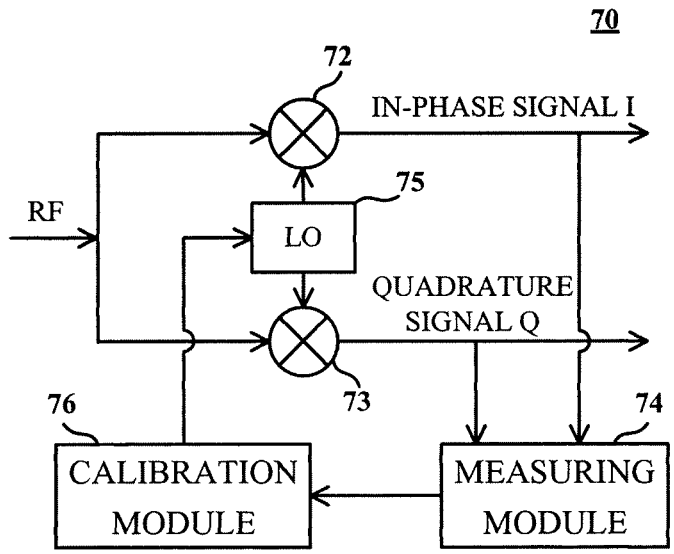
FIG. 7 is partial block diagram of a direct conversion receiver according to another embodiment of the present disclosure.

A direct conversion receiver is provided according to another embodiment of the present disclosure. Referring to FIG. 7, a direct conversion receiver 70 in this embodiment comprises an in-phase switch mixer 72, a quadrature switch mixer 73, a measuring module 74, an oscillation module 75 and a calibration module 76. To explicitly present technical features of the present disclosure, other hardware components of the direct conversion receiver 70, such as a subsequent baseband circuit, are not depicted in the diagram.

The in-phase switch mixer 72 corresponds to an in-phase path and converts an RF signal to an in-phase baseband signal I. The quadrature switch mixer 73 corresponds to a quadrature path and converts an RF signal to a quadrature baseband signal Q. The oscillation module 75 provides a local oscillation signal LO required by the in-phase switch mixer 72 and the quadrature switch mixer 73. As shown in FIG. 7, the measuring module 74 respectively measures the second-order inter-modulation energies of the in-phase path and the quadrature path.

The foregoing calibration method applied to the switch mixer 42 is also applicable to the in-phase switch mixer 72 and quadrature switch mixer 73. In other words, the calibration module 76 may utilize the abovementioned approach to respectively calibrate the in-phase switch mixer 72 and the quadrature switch mixer 73 according to the measured results of the measuring module 74.

In practice, the calibration module 76 may also take mutual effects of the in-phase switch mixer 72 and the quadrature switch mixer 73 into consideration since the in-phase path and the quadrature path mutually impose influence on each other. In this embodiment, the calibration module 76 first sets the switch duty cycle of the quadrature switch mixer 73 to a constant value (e.g., setting the direct-current level of the local oscillation signals LO+/LO− to be provided to the quadrature mixer 73 to $V_{CM}$), and only adjusts the switch duty cycle of the in-phase mixer 72. For example, the calibration module 76 may control the oscillation module 75 to adjust the in-phase switch duty cycle by changing the direct-current level of the local oscillation signals LO+/LO− provided to the in-phase switch mixer 72.

When the calibration module 76 adjusts the in-phase switch duty cycle to being shorter than a standard duty cycle, the measuring module 74 measures the second-order inter-modulation distortion energy of the in-phase path and the second-order inter-modulation distortion energy of the quadrature path to respectively obtain a first in-phase second-order distortion and a first quadrature second-order distortion. When the calibration module 76 adjusts the in-phase switch duty cycle to being longer than the standard duty cycle, the measuring module 74 similarly measures the second-order inter-modulation energies of the two paths to respectively obtain a second in-phase second-order distortion and a second quadrature second-order distortion.

Figure 8:
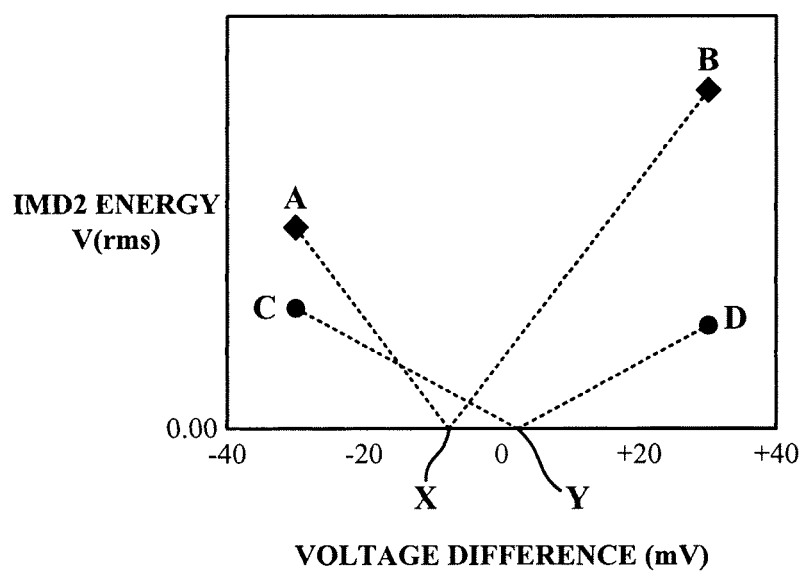
FIG. 8 is a relationship diagram of a voltage difference and an in-phase/quadrature second-order inter-modulation distortion energy.

FIG. 8 shows an example of the above measured results. Four points A, B, C and D respectively correspond to the first in-phase second-order distortion, the second in-phase second-order distortion, the first quadrature second-order distortion and the second quadrature second-order distortion. By implementing the foregoing approach, the calibration module 76 identifies an intersecting point X according to the points A and B as well as an intersecting point Y according to the points C and D. The first in-phase second-order distortion (A) and the second in-phase second-order distortion correspond to an in-phase distortion change rate; the first quadrature second-order distortion (C) and the second quadrature second-order distortion (D) correspond to a quadrature distortion change rate. By comparing slopes of segments XB and YD, it is observed that the second-order inter-modulation energy change rate of the in-phase path is greater when the in-phase switch duty cycle is adjusted. However, it is to be noted that the possibility that the slope of the segment YD being greater than the slope of the segment XB also exists.

In this embodiment, the calibration module 76 selects a greater value out of the in-phase distortion change rate and the quadrature distortion change rate, and determines a calibration signal corresponding to an approximately zero distortion according to the distortions corresponding to the greater change rate. Referring to FIG. 8 for example, the calibration module 76 determines the calibration signal according to the first in-phase second-order distortion (A) and the second in-phase second-order distortion (B) corresponding to the greater change rate. In other words, the calibration module 76 may select a horizontal coordinate of the intersecting point X as the voltage difference for compensating the in-phase switch mixer 72, and calibrate the direct-current level of the local oscillation signal provided to the in-phase switch mixer 72, so as to allow the in-phase switch mixer 72 to have the calibrated duty cycle corresponding to a low second-order inter-modulation energy.

Next, the calibration module 76 sets the switch duty cycle of the in-phase switch mixer 72 to the calibrated duty cycle to adjust the switch duty cycle of the quadrature switch mixer 73. For example, the calibration module 76 may control the oscillation module 75 to adjust the quadrature switch duty cycle by changing the direct-current level of the local oscillation signals LO+/LO− provided to the quadrature switch mixer 73.

When the calibration module 76 adjusts the quadrature switch duty cycle to being shorter than a standard duty cycle, the measuring module 74 measures a third in-phase second-order distortion and a third quadrature second-order distortion. When the calibration module 76 adjusts the quadrature switch duty cycle to being longer than the standard duty cycle, the measuring module 74 measures a fourth in-phase second-order distortion and a fourth quadrature second-order distortion. By implementing the above mechanism associated with FIG. 8, the calibration module 76 determines another calibration signal provided to the quadrature switch mixer 73 according to the distortions, so that the quadrature switch duty cycle may become another calibrated duty cycle.

Therefore, in this embodiment, the calibration module 76 first calibrates the in-phase switch mixer 72 and then calibrates the quadrature switch mixer 73 to respectively obtain the calibration signals that are respectively appropriate for the two mixers. In another embodiment, the calibration module 76 may continue to set the switch duty cycle of the quadrature switch mixer 73 to the above calibrated duty cycle, followed by again calibrating the in-phase switch mixer 72. By iterating the calibration process, a set of calibration signals with the minimum second-order inter-modulation distortion energy of the in-phase path and the quadrature path may be gradually identified. In practice, the calibration module 76 may be designed to stop testing for the preferred calibration signal after repeating the above procedure for a number of times according to the measured results of the measuring module 74. For example, the testing is stopped when all test results are smaller than a predetermined value.

As stated the previous description on the calibration approach with respect to the switch mixer 42, during the testing process, measurement accuracy and convenience may be facilitated by a difference greater than a threshold between the in-phase/quadrature switch cycle and the standard duty cycle when the calibration module 76 adjusts the in-phase/quadrature switch duty cycle to being longer or shorter than the standard duty cycle.

Figure 9:
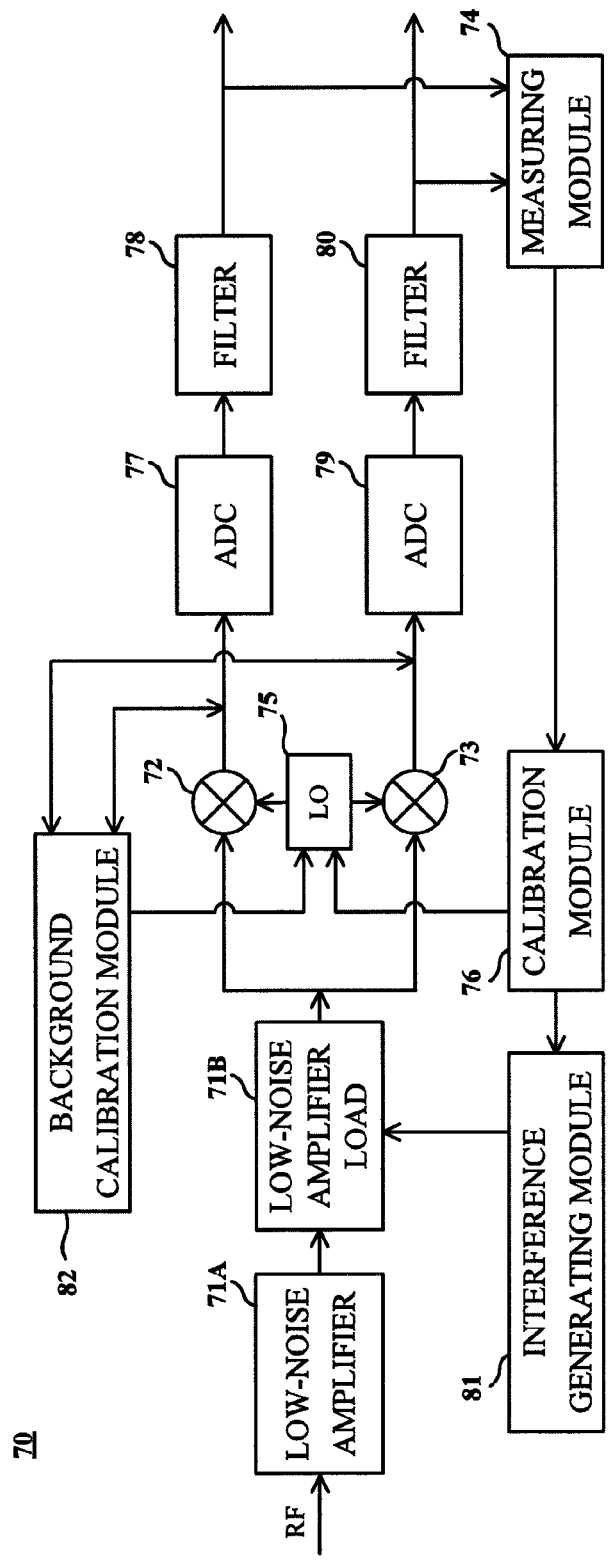
FIG. 9 is a detailed schematic diagram of a direct conversion receiver according to an embodiment of the present disclosure.

FIG. 9 shows a detailed schematic diagram of the direct conversion receiver 70 according to an embodiment of the present disclosure. As shown, the direct conversion receiver 70 further comprises a low-noise amplifier 71A, a low-noise amplifier load 71B, analog-to-digital converters (ADC) 77 and 79, filters 78 and 80, an interference generating module 81, and a background calibration module 82.

The ADC 77 is an in-phase ADC for converting the in-phase baseband signal I to an in-phase digital signal. The ADC 79 is a quadrature ADC for converting the quadrature baseband signal Q to a quadrature digital signal. The filters 78 and 80 remove noise in the digital signals. In this embodiment, the measuring module 74 measures digital output signals of the filters 78 and 80 to determine the second-order inter-modulation distortions of the two paths. The interference generating module 81 provides a monotone interference signal or a dual-tone interference signal for simulating possible external interferences. In this embodiment, the interference signal is provided to the low-noise amplifier 71B to enter input ends of the in-phase switch mixer 72 and the quadrature switch mixer 73.

The background calibration module 82 performs a background calibration procedure before the calibration module 76 calibrates the in-phase switch mixer 72 and the quadrature switch mixer 73 to pre-remove DC offsets of the in-phase path and the quadrature path. In this embodiment, when the RF signal or the above simulated interference signal is not yet input, the background calibration module 82 controls the oscillation module 75 to respectively provide the local oscillation signal to the in-phase switch mixer 72 and the quadrature switch mixer as well as to detect direct-current energies at two output ends of the two mixers. According to detection results, the background calibration module 82 respectively adjusts the direct-current levels of the in-phase path and the quadrature path, so that the direct-current energies of the two paths are approximately zero. Therefore, partial mismatch factors are compensated before the calibration module 76 starts calibrating the two mixers, such that a range that needs to be calibrated by the calibration module 76 is reduced.

It is to be noted that, although not indicated in FIG. 7 and FIG. 9, the RF signal RF, the in-phase signal I, the quadrature signal Q and the local oscillation signal LO may all be differential signals.

Figure 10:
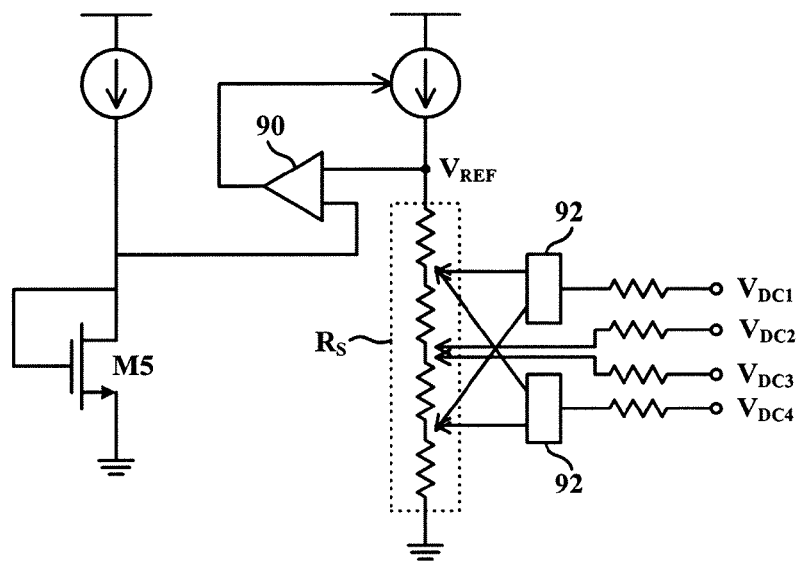
FIG. 10 is a schematic diagram of a circuit for generating a direct-current level of a local oscillation signal.

FIG. 10 shows a schematic diagram of an exemplary circuit for generating a direct-current level of a local oscillation signal. The MOSFET M5 in the diagram is designed to be identical to the transistors (e.g., the transistors M1 to M4) in the mixers and is physically arranged neighboring to one another. Being limited by an operational amplifier 90, a drain voltage of the transistor M4 is approximately the same as an uppermost reference voltage $V_{REF}$ of serial resistors $R_S$. As a threshold voltage of the transistors in the mixers changes with temperature, a threshold voltage of the transistor M4 is also changed by an approximately same range, and at the same time the reference voltage $V_{REF}$ is also adjusted to affect the voltages $V_{DC1}$ to $V_{DC4}$ generated by the serial resistors $R_S$. Such interlinking relationship is in equivalence correspondingly changing the direct-current levels of the local oscillation signals as the temperature changes, so that influences imposed on the switch duty cycles by the threshold voltages of the transistors in the mixers are counteracted.

Therefore, by maintaining a change rate of temperature relative to the reference voltage for generating the direct-current level of the local oscillation signal approximately equal to a change rate of temperature relative to the threshold voltage of a transistor in the in-phase switch mixer, influences due to temperature changes may be counteracted. In FIG. 10, the voltages $V_{DC1}$ to $V_{DC4}$ respectively correspond to the direct-current levels of the local oscillation signals received by the transistors M1 to M4. A block with a denotation 92 represents an R-2R resistor circuit that is controlled by the calibration module 46 or the calibration module 76 to adjust the voltages $V_{DC1}$ to $V_{DC4}$ as desired.

Figure 11:
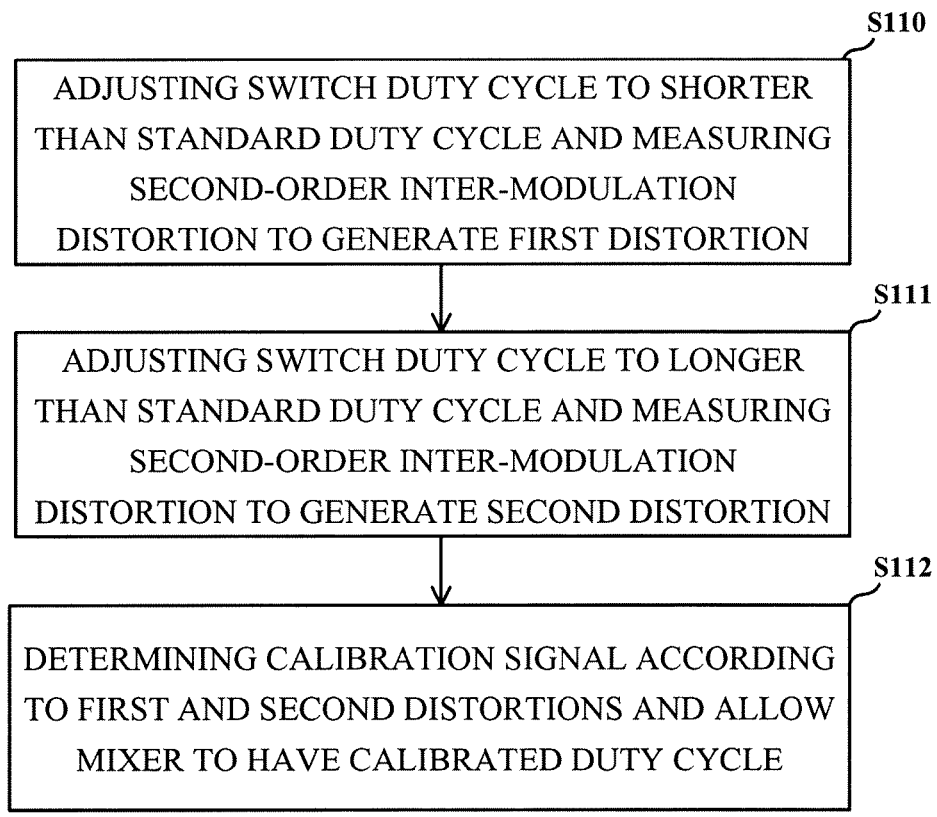
FIG. 11 is a flowchart of a calibration method according to an embodiment of the present disclosure.

FIG. 11 shows a flowchart of a calibration method for a direct conversion receiver is provided according to another embodiment of the present disclosure. For example, the calibration method may be applied to the direct conversion receiver 40 in FIG. 4. The direct conversion receiver comprises a switch mixer. In the calibration method, Step S110 is first performed to adjust a switch duty cycle of the switch mixer to being shorter than a standard duty cycle, and a second-order inter-modulation distortion in the direct conversion receiver at this point is measured as a first second-order distortion. In Step S111, the switch duty cycle is adjusted to being longer than the standard duty cycle, and the second-order inter-modulation distortion at this point is measured as a second second-order distortion. In Step S112, a calibration signal provided to the switch mixer is determined according to the first second-order distortion and the second second-order distortion, so that the switch mixer is allowed to have a calibrated duty cycle.

Figure 12:
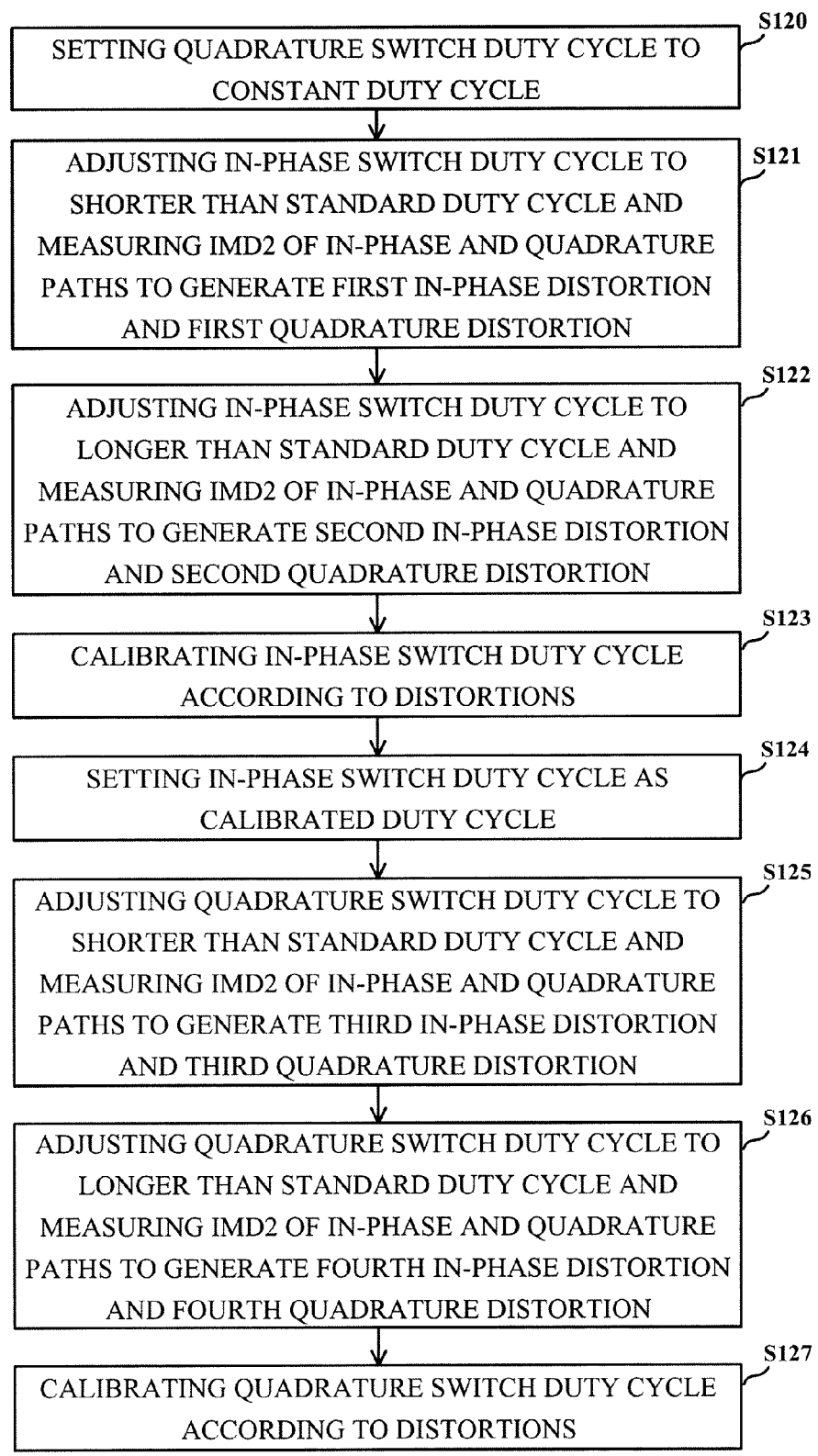
FIG. 12 is a flowchart of a calibration method according to another embodiment of the present disclosure.

FIG. 12 shows a flowchart of a calibration method for a direct conversion receiver is provided according to yet another embodiment of the present disclosure. The direct conversion receiver implementing the calibration method comprises an in-phase switch mixer and a quadrature switch mixer. The in-phase switch mixer corresponds to an in-phase path, and the quadrature switch mixer corresponds to a quadrature path.

Steps S120 to S123 are chiefly associated with a calibration procedure for the in-phase switch mixer. In Step S120, a quadrature switch duty cycle of the quadrature switch mixer is set to a constant duty cycle. In Step S121, an in-phase switch duty cycle of the in-phase switch mixer is adjusted to being shorter than a standard duty cycle, and a second-order inter-modulation distortion of the in-phase path and a second-order inter-modulation distortion of the quadrature path are measured to respectively generate a first in-phase second-order distortion and a first quadrature second-order distortion. In Step S122, the in-phase switch duty cycle of the in-phase switch mixer is adjusted to being longer than the standard duty cycle, and the second-order inter-modulation distortion of the in-phase path and the second-order inter-modulation distortion of the quadrature path are measured to respectively generate a second in-phase second-order distortion and a second quadrature second-order distortion. In Step S123, a calibration signal is determined according to the four distortions from the previous two steps and provided to the in-phase switch mixer, so that the in-phase switch duty cycle becomes a calibrated duty cycle.

Subsequent Steps S124 to S127 are chiefly associated with a calibration procedure for the quadrature switch mixer. In Step S124, the in-phase switch duty cycle of the in-phase switch mixer is set to the calibrated duty cycle generated in Step S123. In Step S125, a quadrature switch duty cycle of the quadrature switch mixer is adjusted to being shorter than the standard duty cycle, and the second-order inter-modulation distortion of the in-phase path and the second-order inter-modulation distortion of the quadrature path are measured to respectively generate a third in-phase second-order distortion and a third quadrature second-order distortion. In Step S126, the quadrature switch duty cycle of the quadrature switch mixer is adjusted to being longer than the standard duty cycle, and the second-order inter-modulation distortion of the in-phase path and the second-order inter-modulation distortion of the quadrature path are measured to respectively generate a fourth in-phase second-order distortion and a fourth quadrature second-order distortion. In Step S127, a calibration signal to be provided to the quadrature switch mixer is determined according to the four distortions from the previous two steps, so that the quadrature switch duty cycle becomes a calibrated duty cycle.

The calibration method in FIG. 12 may be applied to the direct conversion receiver 70 shown in FIG. 7. Other details applicable to the direct conversion receiver 70 such as procedures of pre-background calibration or iterated calibrations of the two mixers may also be integrated to the calibration method shown in FIG. 12, and shall not be again described. It is to be noted that, in practice, the calibration procedure for the quadrature switch mixer may also be performed before the calibration procedure for the in-phase switch mixer, and is not limited by the order shown in FIG. 12.

It is illustrated with the above embodiments, in the receiver and the calibration method of the present disclosure, by utilizing the predetermined relationship between the switch duty cycle and the second-order inter-modulation distortion of the switch mixer, the switch duty cycle of the switch mixer can be quickly calibrated without having to undergo a large amount of tests, so as to effectively reduce the second-order inter-modulation distortion energy in the direct conversion receiver. Therefore, the receiver and the calibration method of the present disclosure are particularly suitable for a system such as a WCMDA communication system adopting a direct conversion receiver.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A direct conversion receiver, comprising:
   a switch mixer, for converting a radio frequency (RF) signal to a baseband signal;
   a measuring module, for measuring a second-order distortion; and
   a calibration module, for adjusting a switch duty cycle of the switch mixer;
   wherein, the measuring module measures a first second-order distortion when the calibration module adjusts the switch duty cycle to being shorter than a standard duty cycle, and measures a second second-order distortion when the calibration module adjusts the switch duty cycle to being longer than the standard duty cycle; the calibration module generates a calibration signal being sent to the switch mixer according to the first second-order distortion and the second second-order distortion, so as to allow the switch mixer to have a calibrated duty cycle.

2. The direct conversion receiver according to claim 1, wherein the calibration module adjusts the switch duty cycle by changing a direct-current level of a local oscillation signal provided to the switch mixer, and the calibration signal adjusts the direct-current level to a calibrated direct-current level, so as to allow the switch mixer to have the calibrated duty cycle.

3. The direct conversion receiver according to claim 1, wherein the calibration module determines the calibration signal corresponding to a zero distortion by interpolation based on the first second-order distortion and the second second-order distortion.

4. The direct conversion receiver according to claim 1, wherein when the calibration module adjusts the switch duty cycle to being shorter or longer than the standard duty cycle, a difference greater than a threshold exists between the switch duty cycle and the standard duty cycle.

5. A direct-current receiver, comprising:
   an in-phase switch mixer, located on an in-phase path and having an in-phase switch duty cycle, for converting an RF signal to an in-phase baseband signal;
   a quadrature switch mixer, located on a quadrature path and having a quadrature switch duty cycle, for converting the RF signal to a quadrature baseband signal;
   a measuring module, for measuring an in-phase second-order distortion of the in-phase path and a quadrature second-order distortion of the quadrature path; and
   a calibration module, for adjusting the in-phase switch duty cycle and the quadrature switch duty cycle;
   wherein, the quadrature switch duty cycle possesses a substantially constant duty cycle when the calibration module adjusts the in-phase switch duty cycle; the measuring module measures a first in-phase second-order distortion and a first quadrature second-order distortion when the calibration module adjusts the in-phase switch duty cycle to being shorter than a standard duty cycle, and measures a second in-phase second-order distortion and a second quadrature second-order distortion when the calibration module adjusts the in-phase switch duty cycle to being longer than the standard duty cycle; and the calibration module generates a calibration signal to the in-phase switch mixer according to the distortions, so as to allow the in-phase switch duty cycle to be a calibrated duty cycle.

6. The direct conversion receiver according to claim 5, wherein the calibration module adjusts the in-phase switch duty cycle by changing a direct-current level of a local oscillation signal provided to the in-phase switch mixer, and the calibration signal adjusts the direct-current level to a calibrated direct-current level, so as to allow the in-phase switch mixer to have the calibrated duty cycle.

7. The direct conversion receiver according to claim 6, wherein a change rate of a temperature relative to a reference voltage for generating the direct-current level equals a change rate of a temperature relative to a threshold voltage of a transistor in the in-phase switch mixer.

8. The direct conversion receiver according to claim 5, wherein when the calibration module adjusts the in-phase switch duty cycle to being shorter or longer than the standard duty cycle, a difference greater than a threshold exists between the in-phase switch duty cycle and the standard duty cycle.

9. The direct conversion receiver according to claim 5, wherein the first in-phase second-order distortion and the second in-phase second-order distortion correspond to an in-phase distortion change rate, the first quadrature second-order distortion and the second quadrature second-order distortion correspond to a quadrature distortion change rate, and the calibration module selects a greater change rate from the in-phase distortion change rate and the quadrature distortion change rate and determines the calibration signal corresponding to a zero distortion according to the larger change rate.

10. The direct conversion receiver according to claim 5, wherein the in-phase switch duty cycle is the calibrated duty cycle when the calibration module adjusts the quadrature switch duty cycle; the measuring module measures a third in-phase second-order distortion and a third quadrature second-order distortion when the calibration module adjusts the quadrature switch duty cycle to being shorter than the standard duty cycle, and measures a fourth in-phase second-order distortion and a fourth quadrature second-order distortion when the calibration module adjusts the quadrature switch duty cycle to being shorter than the standard duty cycle; and the calibration module provides another calibration signal to be provided to the quadrature switch mixer according to the distortions, so as to allow the quadrature switch duty cycle to become another calibrated duty cycle.

11. The direct conversion receiver according to claim 5, further comprising:
 an in-phase digital-to-analog converter (ADC), for converting the in-phase baseband signal to an in-phase digital signal; and
 a quadrature ADC, for converting the quadrature baseband signal to a quadrature digital signal;
 wherein, the measuring module determines the in-phase second-order distortion according to the in-phase digital signal and determines the quadrature second-order distortion according to the quadrature digital signal.

12. The direct conversion receiver according to claim 5, further comprising:
 an interference generating module, for generating a monotone interference signal or a dual-tone interference signal at inputs ends of the switch mixers.

13. The direct conversion receiver according to claim 5, further comprising:
 an oscillation module, for providing a local oscillation signal to the in-phase switch mixer; and
 a background calibration module, for controlling the oscillation signal to provide the local oscillation signal to the in-phase switch mixer before the calibration module calibrates the switch mixers, and adjusting a direct-current level of the in-phase path so that a direct-current energy of the in-phase path is zero.

14. A calibration method for a direct conversion receiver, the direct conversion receiver comprising an in-phase switch mixer and a quadrature switch mixer, the in-phase switch mixer corresponding to an in-phase path and having an in-phase switch duty cycle, the quadrature switch mixer corresponding to a quadrature path and having a quadrature switch duty cycle, the method comprising:
 a) setting the quadrature switch duty cycle to a constant duty cycle;
 b) adjusting the in-phase switch duty cycle to being shorter than a standard cycle, and measuring an in-phase second-order distortion of the in-phase path and a quadrature second-order distortion of the quadrature path to respectively obtain a first in-phase second order distortion and a first quadrature second-order distortion;
 c) adjusting the in-phase switch duty cycle to being longer than a standard cycle, and measuring the in-phase second-order distortion of the in-phase path and the quadrature second-order distortion of the quadrature path to respectively obtain a second in-phase second order distortion and a second quadrature second-order distortion; and
 d) determining a calibration signal to be provided to the in-phase switch mixer according to the first in-phase second-order distortion, the first quadrature second-order distortion, the second in-phase second-order distortion and the second quadrature second-order distortion, so as to allow the in-phase switch duty cycle to be a calibrated duty cycle.

15. The calibration method according to claim 14, wherein the step (b) and the step (c) adjust the in-phase switch duty cycle by changing a direct-current level of a local oscillation signal provided to the in-phase switch mixer, and the calibration signal generated in the step (d) adjusts the direct-current level to a calibrated direct-current level, so as to allow the in-phase switch mixer to have the calibrated duty cycle.

16. The calibration method according to claim 14, wherein the step (b) and the step (c) respectively adjust the in-phase switch duty cycle to values between which and the standard duty cycle is a difference greater than a threshold.

17. The calibration method according to claim 14, wherein the step (d) comprises:
 determining an in-phase distortion change rate corresponding to the first in-phase second-order distortion and the second in-phase second-order distortion;
 determining a quadrature distortion change rate corresponding to the first quadrature second-order distortion and the second quadrature second-order distortion;
 selecting a greater change rate from the in-phase distortion change rate and the quadrature distortion change rate, and determining the calibration signal corresponding to a zero distortion according to the distortions corresponding to the greater change rate.

18. The calibration method according to claim 14, further comprising:
 setting the in-phase switch duty cycle to the calibrated duty cycle;
 adjusting the quadrature switch duty cycle to being shorter than the standard duty cycle, and measuring the in-phase second-order distortion and the quadrature second-order distortion to respectively generate a third in-phase second-order distortion and a third quadrature second-order distortion;
 adjusting the quadrature switch duty cycle to being longer than the standard duty cycle, and measuring the in-phase second-order distortion and the quadrature second-order distortion to respectively generate a fourth in-phase second-order distortion and a fourth quadrature second-order distortion; and
 determining another calibration signal according to the third in-phase second-order distortion, the third quadrature second-order distortion, the fourth in-phase second-order distortion and the fourth quadrature second-order distortion, so as to allow the quadrature switch mixer to have another calibrated duty cycle.

19. The calibration method according to claim 14, wherein when the step (b) and the step (c) are performed, a monotone interference signal or a dual-tone interference signal is provided to input ends of the switch mixers.

* * * * *